(12) United States Patent
Koda

(10) Patent No.: US 12,042,722 B2
(45) Date of Patent: Jul. 23, 2024

(54) DEVICE INCLUDING MOVABLE MASS BODY PROVIDED IN HOUSING

(71) Applicant: Sony Interactive Entertainment Inc., Tokyo (JP)

(72) Inventor: Yuta Koda, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 152 days.

(21) Appl. No.: 17/453,072

(22) Filed: Nov. 1, 2021

(65) Prior Publication Data
US 2022/0152486 A1     May 19, 2022

(30) Foreign Application Priority Data
Nov. 19, 2020   (JP) ................................. 2020-192712

(51) Int. Cl.
| A63F 13/24 | (2014.01) |
| A63F 13/285 | (2014.01) |
| G06F 3/01 | (2006.01) |

(52) U.S. Cl.
CPC ............ *A63F 13/285* (2014.09); *G06F 3/016* (2013.01); *A63F 13/24* (2014.09); *A63F 2300/1037* (2013.01)

(58) Field of Classification Search
CPC ..................... A63F 13/285; A63F 13/24; A63F 2300/1037; G06F 3/016
See application file for complete search history.

(56) References Cited

U.S. PATENT DOCUMENTS

| 6,777,895 | B2* | 8/2004 | Shimoda ............... | H02K 33/16 |
| | | | | 340/407.1 |
| 8,251,821 | B1* | 8/2012 | Yen ......................... | A63F 13/24 |
| | | | | 463/31 |
| 9,737,817 | B1* | 8/2017 | Ricky ...................... | A63B 60/42 |
| 2010/0245232 | A1* | 9/2010 | Birnbaum ............... | G06F 3/017 |
| | | | | 345/156 |
| 2010/0295667 | A1* | 11/2010 | Kyung ................... | G06F 3/0346 |
| | | | | 340/407.2 |
| 2015/0084875 | A1* | 3/2015 | Liu ......................... | G06F 3/016 |
| | | | | 345/173 |
| 2016/0189493 | A1* | 6/2016 | Rihn ....................... | G06T 15/00 |
| | | | | 340/407.1 |
| 2019/0363622 | A1* | 11/2019 | Kim ........................ | H02K 33/16 |
| 2019/0384396 | A1* | 12/2019 | Cruz Hernandez ... | B06B 1/0246 |
| 2021/0328491 | A1* | 10/2021 | Takahashi .............. | H02K 33/16 |
| 2023/0136016 | A1* | 5/2023 | Cruz ....................... | G06F 3/016 |
| | | | | 345/156 |

* cited by examiner

*Primary Examiner* — Omkar A Deodhar
*Assistant Examiner* — Shauna-Kay Hall
(74) *Attorney, Agent, or Firm* — Matthew B. Dernier, Esq.

(57) ABSTRACT

Provided is a device including a housing, a mass body arranged in the housing, a movement mechanism that moves the mass body in the housing, a vibrator, and a control unit that controls movement of the mass body and vibration of the vibrator. The control unit is capable of changing a position at which the vibrator is to vibrate in the housing.

7 Claims, 9 Drawing Sheets

FIG.1
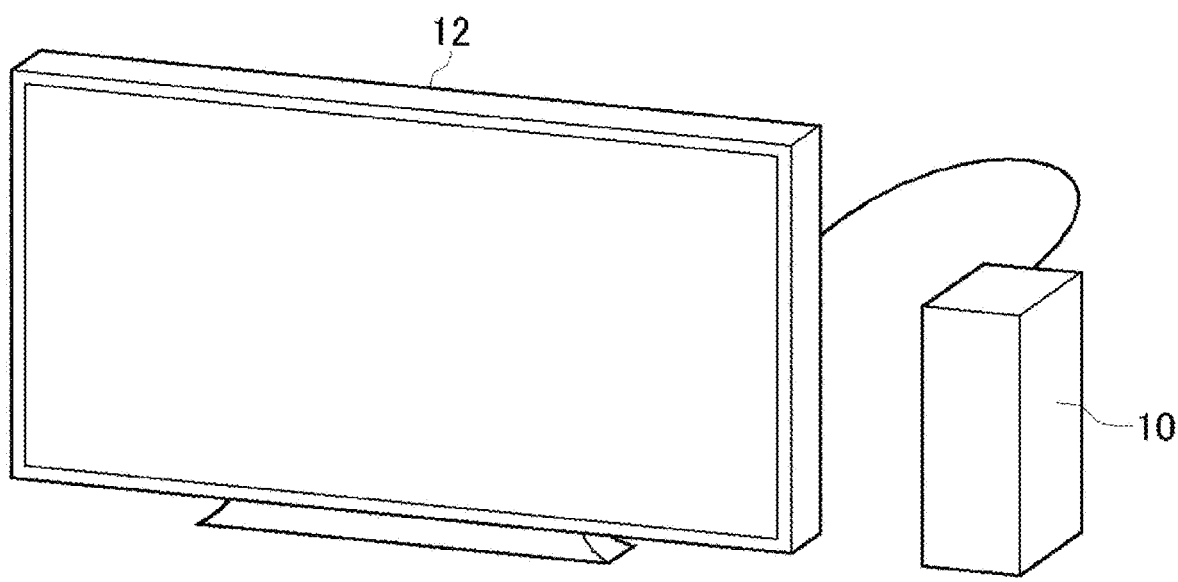
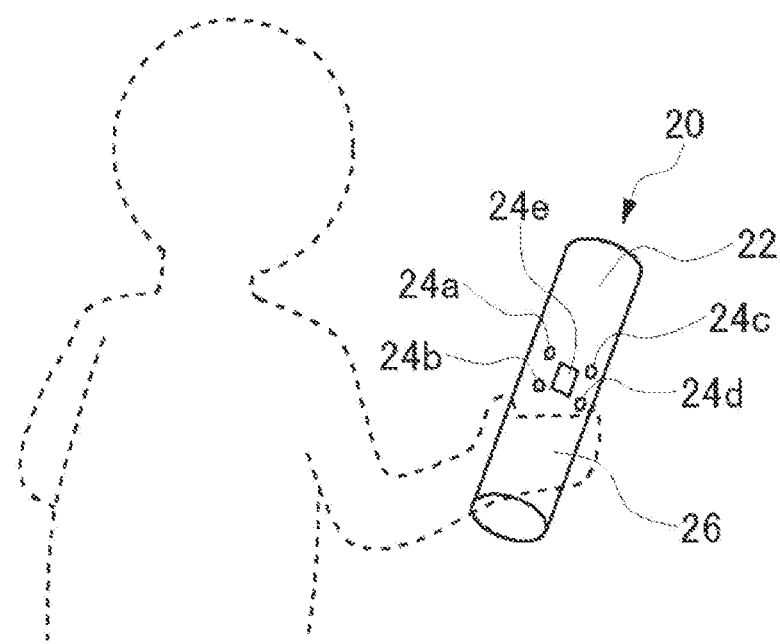

FIG. 5A
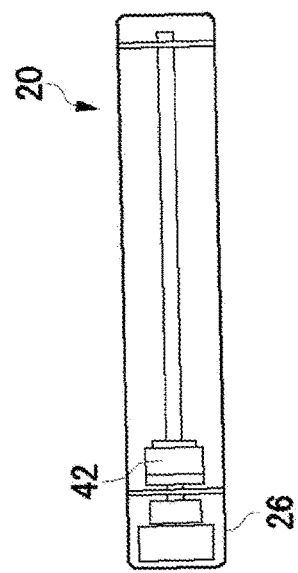
FIG. 5B
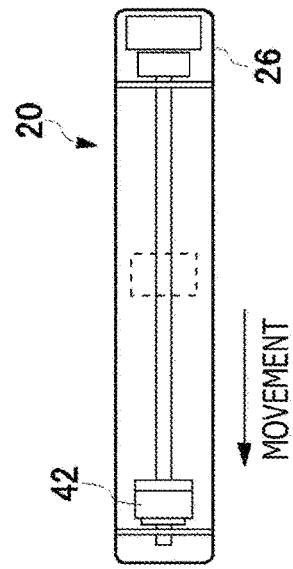
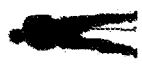
FIG. 5C
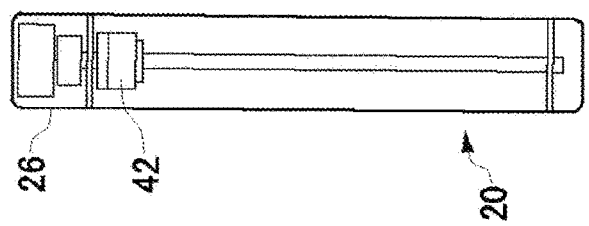

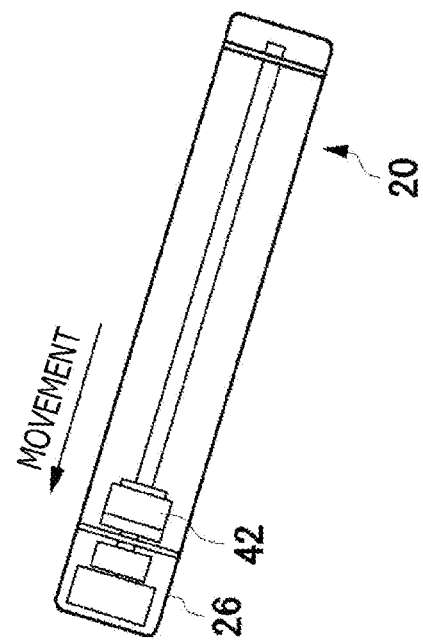
FIG.7B
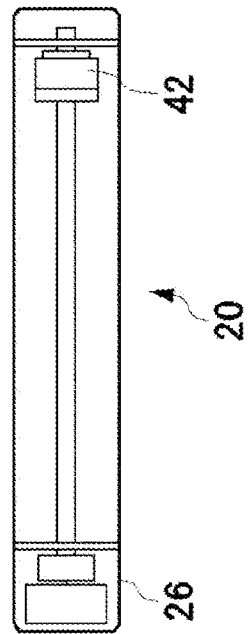
FIG.7A

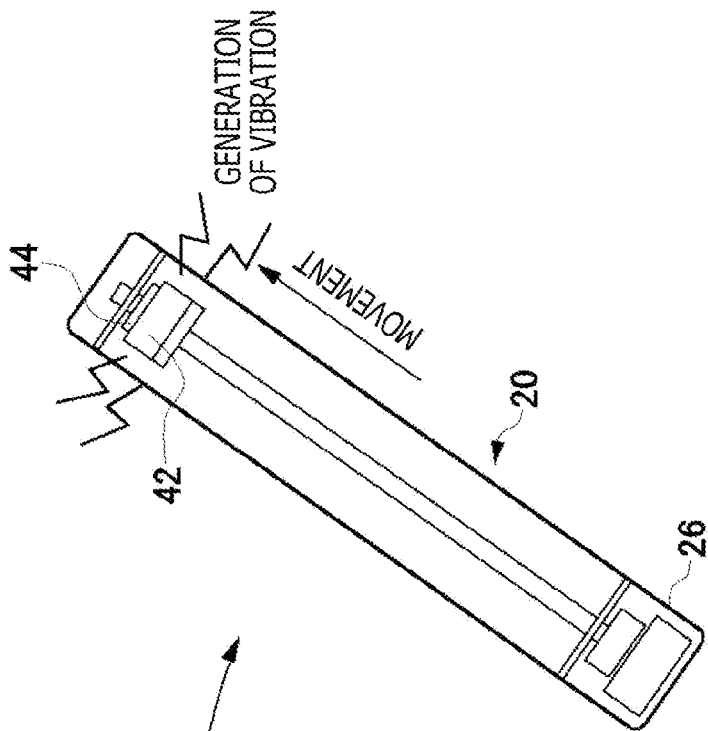
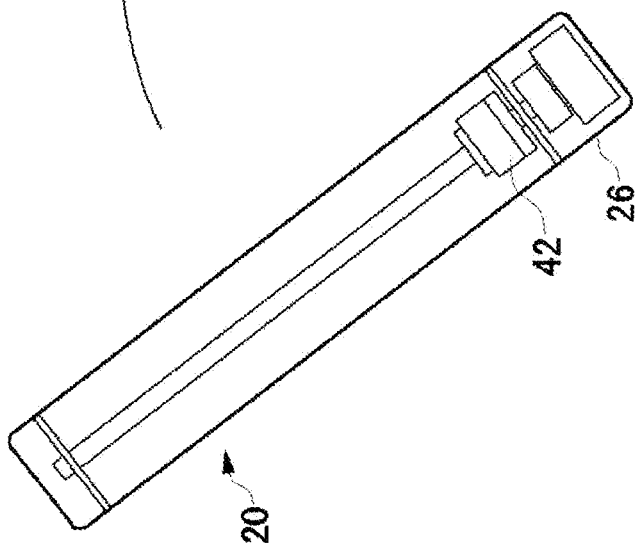

20a

20b

DEVICE INCLUDING MOVABLE MASS BODY PROVIDED IN HOUSING

CROSS REFERENCE TO RELATED APPLICATION

This application claims the benefit of Japanese Priority Patent Application JP 2020-192712 filed Nov. 19, 2020, the entire contents of which are incorporated herein by reference.

BACKGROUND

The present disclosure relates to a device that includes a movable mass body provided in a housing.

Japanese Patent Laid-Open No. 2010-225155 discloses a portable computer interface that includes a housing, a mass body coupled to the housing, and an actuator coupled to the mass body for changing a position of the mass body with respect to the housing. If the actuator receives a signal indicative of a change of the center of gravity of the portable computer interface, then the actuator changes the position of the mass body. The portable computer interface disclosed in Japanese Patent Laid-Open No. 2010-225155 is used as an operation device of a game and provides a tactile feedback to its user.

SUMMARY

In a game of golf, fishing, and so forth, by using an elongated game controller, a player can operate the game, with a sense that he or she uses a real tool. It is expected that the way to enjoy the game can be expanded by incorporating a mover and/or a vibrator in such a game controller as just described and controlling the mover and/or the vibrator such that a behavior simulating that of the real tool is exhibited.

Therefore, it is desirable to provide a novel device that provides a tactile feedback to its user. Although the device may be a game controller having an operation member such as a button thereon, it may otherwise be a device that does not have any operation member.

According to an embodiment of the present disclosure, there is provided a device including a housing, a mass body arranged in the housing, a movement mechanism that moves the mass body in the housing, a vibrator, and a control unit that controls movement of the mass body and vibration of the vibrator. The control unit is capable of changing a position at which the vibrator is to vibrate in the housing.

According to the present disclosure, a device which provides a tactile feedback to its user can be provided.

The above and other objects, features and advantages of the present disclosure will become apparent from the following description and the appended claims, taken in conjunction with the accompanying drawings in which like parts or elements are denoted by like reference characters.

BRIEF DESCRIPTION OF THE DRAWINGS

FIG. 1 is a schematic view depicting an example of a configuration of an information processing system according to an embodiment of the present disclosure;

FIGS. 5A to 5C, 6A and 6B, 7A and 7B, 8A and 8B, and 9A to 9C are schematic views each depicting a position of a mass body;

DETAILED DESCRIPTION OF THE PREFERRED EMBODIMENT

Figure 2:
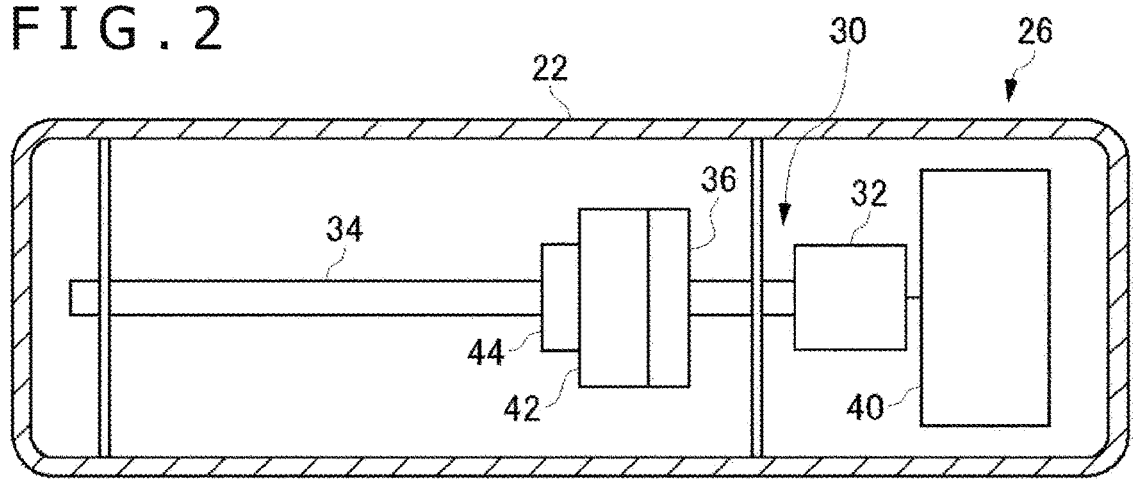
FIG. 2 is a schematic sectional view depicting an example of an internal structure of an inputting device.

FIG. 1 depicts an example of a configuration of an information processing system 1 according to an embodiment of the present disclosure. Referring to FIG. 1, the information processing system 1 includes an information processing apparatus 10 that executes a game program, an outputting apparatus 12, and an inputting device 20. The inputting device 20 is an operation inputting device that allows a user to input an operation for a game. The information processing apparatus 10 executes the game program on the basis of operation data transmitted thereto from the inputting device 20 and outputs a game image and game sound from the outputting apparatus 12.

The outputting apparatus 12 may be connected to the information processing apparatus 10 by a wire cable or may be connected wirelessly by a wireless local area network (LAN) or the like. Although the outputting apparatus 12 may be a television set, it may otherwise be a head-mounted display (HMD).

The inputting device 20 of the embodiment is a bar-like game controller that is driven by a built-in battery and has a housing 22 in the form of a tube. Although the housing 22 may have a cylindrical shape, it may otherwise have a polygonal tubular shape or may have cross sections that are different along a longitudinal direction thereof. The housing 22 has a surface on which operation buttons 24a, 24b, 24c, 24d, and 24e (where they are not specifically distinguished from each other, each of them is referred to as an "operation button 24") are provided. A rear end side portion of the housing 22 configures a grip portion 26 for allowing the user to grasp the housing 22 with a hand such that the user can operate any operation button 24 with his or her thumb in a state in which the user grasps the grip portion 26. It is to be noted that a different operation button or buttons that can be operated with a forefinger may be provided on the rear face side of the operation button 24.

The inputting device 20 is configured as a wireless controller that can communicate by wireless communication with the information processing apparatus 10. If the user operates the operation button 24, then the inputting device 20 transmits operation data representative of the operation to the information processing apparatus 10 by wireless transmission. The inputting device 20 and the information processing apparatus 10 may establish wireless connection therebetween using the Bluetooth (registered trademark) protocol. It is to be noted that the inputting device 20 may be a wired controller connected to the information processing apparatus 10 through a cable. The inputting device 20 of the embodiment has a structure that provides a tactile feedback to a hand of the user grasping the grip portion 26.

FIG. 2 depicts an example of an internal structure of the inputting device. In FIG. 2, illustration of the operation buttons 24 is omitted. Referring to FIG. 2, the inputting device 20 includes a mass body 42 arranged in the housing 22, a vibrator 44 arranged in the housing 22, a movement mechanism 30 that moves the mass body 42 and the vibrator 44 in the housing 22, and a processing device 40. The movement mechanism 30 is a linear motion mechanism that includes a motor 32 and a ball screw 34 and moves a mover 36 in the longitudinal direction of the housing 22. In particular, the mover 36 is moved on an axial line of the ball screw 34 by rotation of the ball screw 34. In the example of the structure depicted in FIG. 2, the mass body 42 and the vibrator 44 are fixed to the mover 36 such that the mass body 42 and the vibrator 44 move integrally with the mover 36.

The processing device 40 moves the mass body 42 in the housing 22 to dynamically change the position of the center of gravity of the inputting device 20. Therefore, it is sufficient if the mass body 42 has such a weight that the change of the position of the center of gravity of the inputting device 20 can be sensed by the user. If the mover 36 has a sufficient weight, it is not necessary to attach the mass body 42 to the mover 36, and the mover 36 may act as a mass body.

The processing device 40 supplies electric power to the vibrator 44 to cause the vibrator 44 to vibrate such that an impact can be sensed by the user. The vibrator 44 may be a voice coil motor that can excide vibration of large amplitude. A battery for supplying electric power to the vibrator 44 may be provided on the mover 36, and in this case, it is also possible to utilize the battery as the mass body 42.

Figure 3:
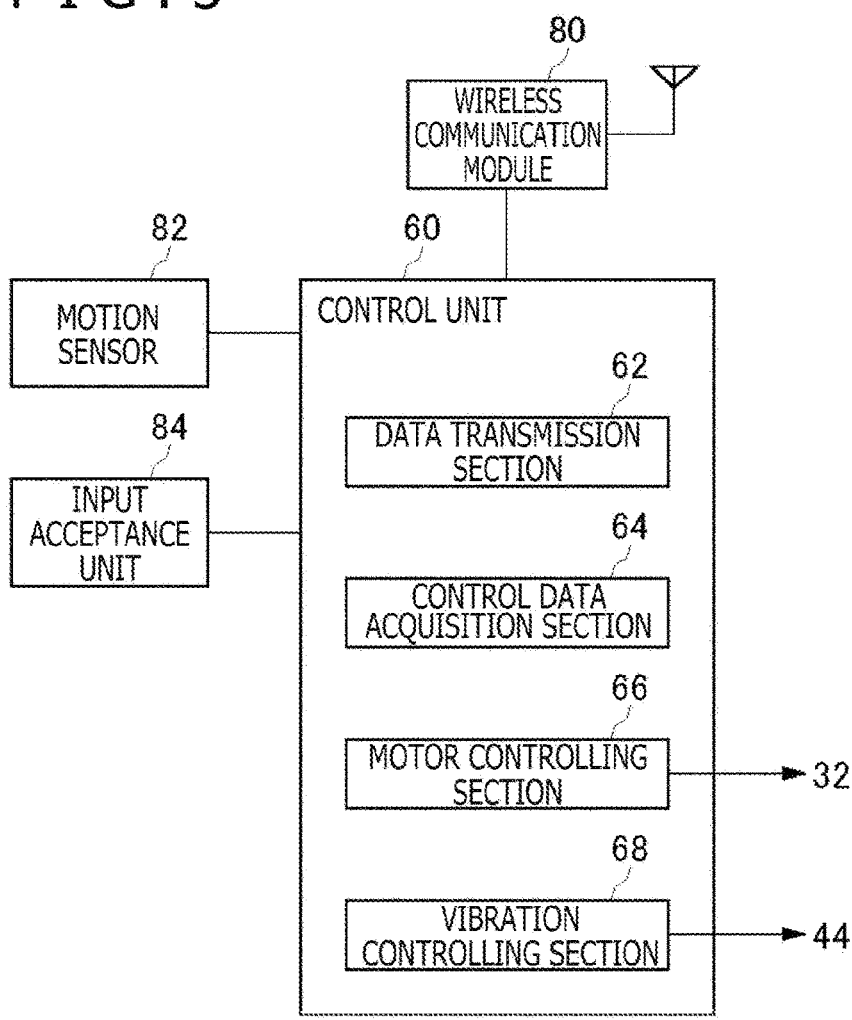
FIG. 3 is a block diagram depicting functional blocks of a processing device.

FIG. 3 depicts functional blocks of the processing device 40. The processing device 40 includes a control unit 60, a wireless communication module 80, a motion sensor 82, and an input acceptance unit 84. The wireless communication module 80 has a function for transmitting and receiving data to and from a wireless communication module of the information processing apparatus 10. The control unit 60 executes various processes in the inputting device 20 and representatively can control movement of the mass body 42 and vibration of the vibrator 44, to change the position at which the vibrator 44 is to vibrate in the housing 22. The control unit 60 includes a data transmission section 62, a control data acquisition section 64, a motor controlling section 66, and a vibration controlling section 68.

The motion sensor 82 includes a three-axis acceleration sensor and a three-axis gyro sensor. The three-axis acceleration sensor detects acceleration components in three axis directions of x, y, and z, and the three-axis gyro sensor detects an angular speed in an xz plane, a zy plane, and a yx plane. For example, the x axis, the y axis, and the z axis may be set to a widthwise direction, a heightwise direction, and a lengthwise direction (that is a direction from a rear end toward a front end) of the inputting device 20, respectively. The three-axis acceleration sensor and the three-axis gyro sensor may be arranged in the housing 22 of the inputting device 20, for example, at a position in the proximity of the center in the housing 22. The motion sensor 82 supplies detected sensor values to the data transmission section 62. The data transmission section 62 transmits sensor data in a predetermined cycle from the wireless communication module 80 to the information processing apparatus 10.

The input acceptance unit 84 accepts an operation input of the operation buttons 24 and supplies operation data of the operation input to the data transmission section 62. The data transmission section 62 transmits the operation data in a predetermined cycle from the wireless communication module 80 to the information processing apparatus 10. The communication cycle between the wireless communication module 80 and the information processing apparatus 10 is preferably set, for example, shorter than the frame rate of the game image.

Figure 4:
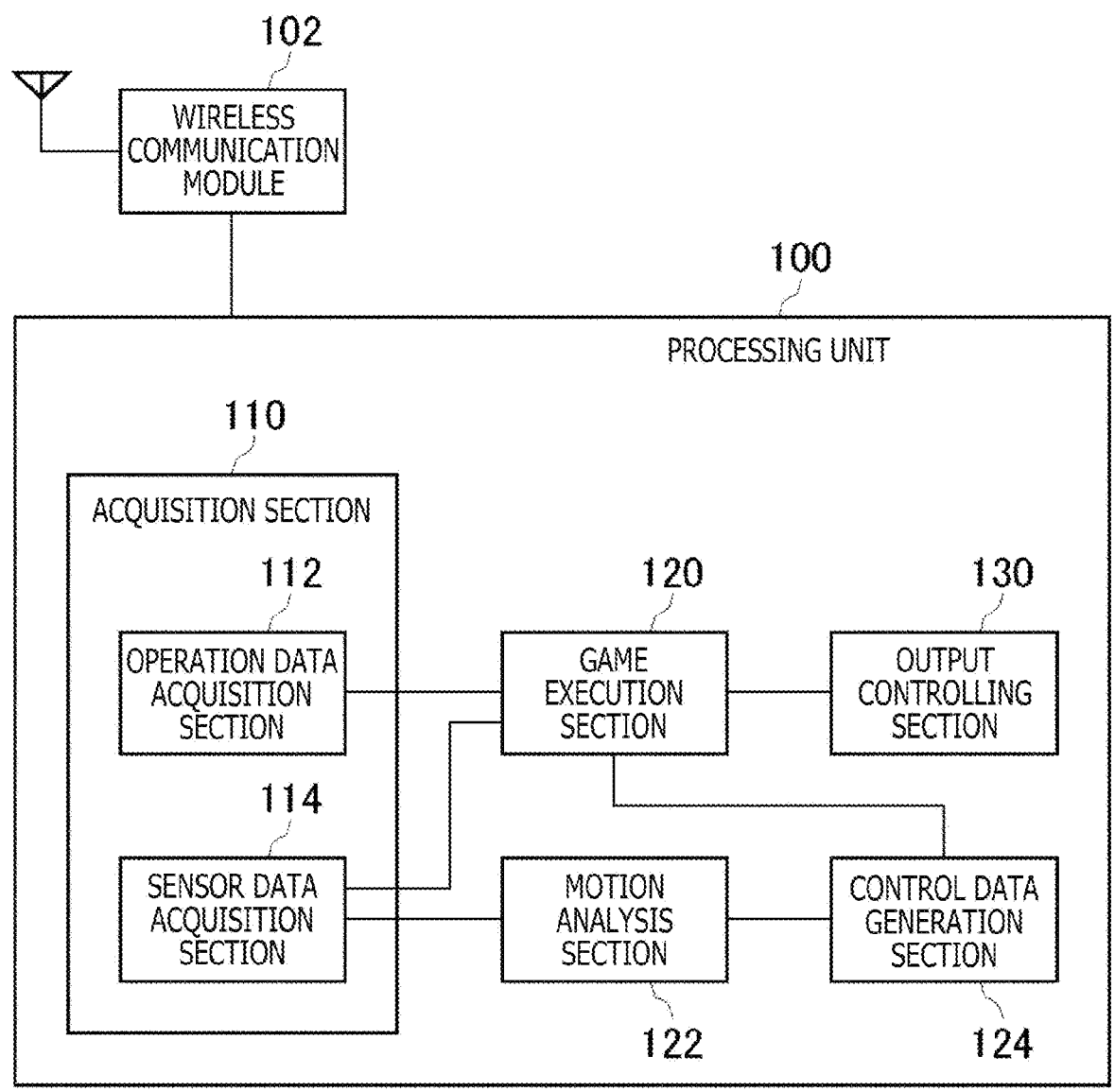
FIG. 4 is a block diagram depicting functional blocks of an information processing device.

FIG. 4 depicts functional blocks of the information processing apparatus 10. The information processing apparatus 10 includes a processing unit 100 and a wireless communication module 102. The processing unit 100 includes an acquisition section 110, a game execution section 120, a motion analysis section 122, a control data generation section 124, and an output controlling section 130. The acquisition section 110 includes an operation data acquisition section 112 and a sensor data acquisition section 114.

The processing function of the information processing apparatus 10 in the embodiment is implemented by a central processing unit (CPU), a memory, a program loaded in the memory and so forth, and FIG. 4 depicts a configuration that is implemented by cooperation of them. Accordingly, it can be recognized by those skilled in the art that such functional blocks can be implemented in various forms by hardware only, by software only, or by a combination of hardware and software.

The wireless communication module 102 has a function for transmitting and receiving data to and from the wireless communication module 80 of the inputting device 20. The wireless communication module 102 receives various kinds of data transmitted from the inputting device 20 and supplies the received data to the acquisition section 110. In the acquisition section 110, the operation data acquisition section 112 acquires operation data of the operation button 24 and supplies the operation data to the game execution section 120, and the sensor data acquisition section 114 acquires sensor data detected by the motion sensor 82 and supplies the sensor data to the game execution section 120 and the motion analysis section 122.

The game execution section 120 executes a game program and processes the operation data supplied from the operation data acquisition section 112 and the sensor data supplied from the sensor data acquisition section 114. The game program performs arithmetic processing for moving a game character in a virtual space on the basis of the operation data and/or the sensor data. The game execution section 120 includes a graphics processing unit (GPU) that executes rendering processing and so forth, and generates image data of the game and simultaneously generates game sound data. The output controlling section 130 outputs the generated game image and game sound from the outputting apparatus 12.

The motion analysis section 122 analyzes the sensor data detected by the motion sensor 82 of the inputting device 20 to derive motion information such as a posture, a speed of movement, and a rate of a posture change of the inputting device 20. The control data generation section 124 generates control data for generating a tactile feedback of the inputting device 20 from the derived motion information. It is to be noted that the control data generation section 124 may generate, in addition to the motion information, control data on the basis of an instruction from the game execution section 120.

In the following, an example in which the user uses the inputting device 20 as a game controller for a golf game is described. In the golf game, the user treats the inputting device 20 as a golf club. The game execution section 120 calculates, from the sensor data detected by the motion sensor 82, a swing trajectory and a head speed of the virtual golf club, to generate a game image in which the game character swings the virtual golf club.

At this time, the motion analysis section 122 analyzes the sensor data from the motion sensor 82 to calculate the motion of the inputting device 20. The control data generation section 124 generates, on the basis of the motion information derived by the inputting device 20 and/or an instruction generated by the game execution section 120, control data for generating a tactile feedback by the inputting device 20, particularly, control data for moving the mass body 42 and/or control data for causing the vibrator 44 to vibrate.

FIGS. 5A to 5C illustrate relations between the posture of the club at the time of a backswing and the position of the mass body 42 in the inputting device 20. In the following description, the rear end side of the housing 22, of the inputting device 20, grasped by the hands is referred to as a "grip side," and the front end side of the housing 22, the front end side being the other end portion, is referred to as a "distal end side."

FIG. 5A depicts a relation between the club posture before a backswing is started and the position of the mass body 42 in the inputting device 20. Before the start of a backswing, the inputting device 20 is directed in a vertical downward direction. At this time, the control data generation section 124 generates control data for positioning the mass body 42 to the grip side, and the wireless communication module 102 transmits the control data to the inputting device 20.

In the inputting device 20, the wireless communication module 80 receives the control data, and the control data acquisition section 64 acquires the control data. The motor controlling section 66 controls the motor 32 on the basis of the control data such that the mass body 42 is positioned on the grip side. It is to be noted that, although, between the information processing apparatus 10 and the inputting device 20, the control data is transmitted from the wireless communication module 102 to the wireless communication module 80 and is acquired by the control data acquisition section 64, description of the transmission and reception of the control data is omitted in the following description.

FIG. 5B depicts a relation between the club posture during a backswing and the position of the mass body 42 in the inputting device 20. When the club is directed to a horizontal direction, the real golf player feels the club heaviest. Therefore, when acquiring, from the motion analysis section 122, motion information indicating that the inputting device 20 is turned from the posture depicted in FIG. 5A (posture of the inputting device 20 directed in the vertical downward direction) so as to be directed in the horizontal direction, the control data generation section 124 generates control data for moving the mass body 42 from the grip side to the distal end side. In the inputting device 20, the motor controlling section 66 controls the motor 32 on the basis of the control data such that the mass body 42 gradually moves to the distal end side. Consequently, when the inputting device 20 is directed to the horizontal direction, the mass body 42 moves to the most distal end side, and the user feels the inputting device 20 heavy. It is to be noted that, after the inputting device 20 is directed to the horizontal direction, the control data generation section 124 generates control data for gradually moving the mass body 42 from the distal end side to the grip side.

FIG. 5C depicts a relation between the club at the top position and the position of the mass body 42 in the inputting device 20. At the moment at which the club switches back to a downswing after moving to the top position, the balance in regard to the center of gravity is established, and therefore, the real golf player feels the club light. Therefore, when acquiring, from the motion analysis section 122, motion information indicating that the inputting device 20 has stopped (has reached the top position), the control data generation section 124 generates control data for moving the mass body 42 to a position closest to the grip side. In the inputting device 20, the motor controlling section 66 controls the motor 32 on the basis of the control data such that the mass body 42 moves to the grip side.

Figure 6B:
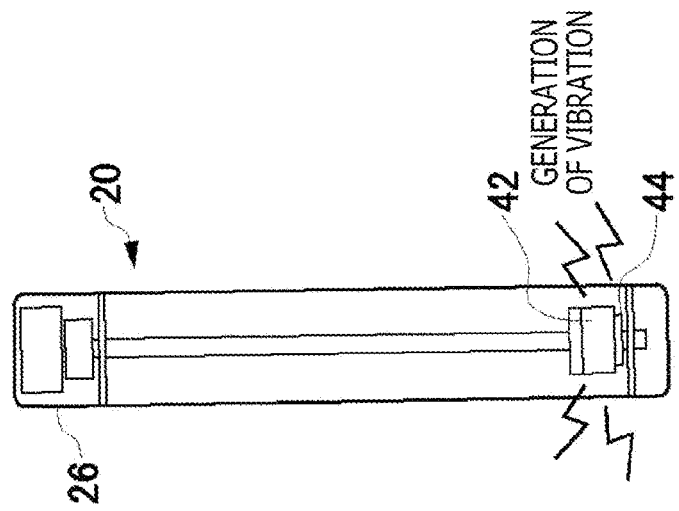
Figure 6A:
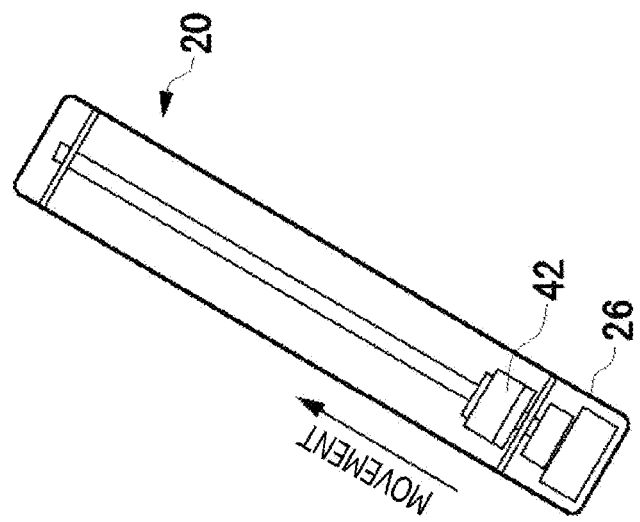

FIG. 6A depicts a relation between the club posture during a downswing and the position of the mass body 42 in the inputting device 20. During the downswing, when acquiring, from the motion analysis section 122, motion information indicating that the inputting device 20 is turning in a reverse direction from the stopping state depicted in FIG. 5C, the control data generation section 124 generates control data for moving the mass body 42 from the grip side to the distal end side. In the inputting device 20, the motor controlling section 66 controls the motor 32 on the basis of the control data such that the mass body 42 gradually moves to the distal end side.

FIG. 6B depicts a relation between the club at the moment of an impact and the position of the mass body 42 in the inputting device 20. When acquiring, from the motion analysis section 122, motion information indicating that the inputting device 20 is directed to the vertical downward direction, the control data generation section 124 generates control data for moving the mass body 42 to the most distal end side and further generates control data for causing the vibrator 44 to vibrate. In the inputting device 20, the motor controlling section 66 controls the motor 32 on the basis of the control data such that the mass body 42 moves to the distal end side, and the vibration controlling section 68 causes the vibrator 44 to vibrate, on the basis of the control data.

The control data generation section 124 generates, on the basis of an instruction from the game, control data for causing the vibrator 44 to vibrate. The game may determine a vibration instruction for the vibrator 44, according to in what manner a face of the golf head hits a ball in a virtual space. When the ball is hit by the core of the golf club face, the game may represent a hitting feeling by determining a vibration instruction for generating agreeable vibration. When the ball is not hit by the core of the golf club face, the game may represent a hitting feeling by determining a vibration instruction for generating irregular vibration including noise. By causing the vibrator 44 to generate an impact at the distal end of the inputting device 20, the distal end being a virtual impact position, the user can obtain a feeling approximate to a real feeling. In such a manner, in the inputting device 20 of the embodiment, the control unit 60 can change the position at which the vibrator 44 vibrates in the housing 22 and can cause an impact to be generated at any position.

FIG. 7A indicates a relation between the club posture in a follow-through and the position of the mass body 42 in the inputting device 20. At the time of the follow-through, the control data generation section 124 generates control data for controlling the mass body 42 to continue to be positioned on the distal end side until the club is directed to the horizontal direction. At the moment of an impact, in a case where the ball is hit not at the core of the golf club face, the game may supply, to the control data generation section 124, a vibration instruction for causing the vibrator 44 to continue to vibrate also after the impact. Consequently, the control data generation section 124 generates control data for causing the vibrator 44 to vibrate. In the inputting device 20, the motor controlling section 66 controls the motor 32 on the basis of the control data such that the mass body 42 is positioned on the distal end side, and the vibration controlling section 68 controls the vibrator 44 to vibrate, on the basis of the control data.

FIG. 7B depicts a relation between the club posture at the end of the follow-through and the position of the mass body 42 in the inputting device 20. When acquiring, from the motion analysis section 122, motion information indicating that the inputting device 20 has stopped (the follow-through has come to an end), the control data generation section 124 generates control data for moving the mass body 42 to the position closest to the grip side. In the inputting device 20, the motor controlling section 66 controls the motor 32 on the basis of the control data such that the mass body 42 moves to the grip side.

Next, an example in which the user uses the inputting device 20 as a game controller for a fishing game is described. In the fishing game, the user treats the inputting device 20 as a fishing rod.

FIGS. 8A and 8B depict relations between the posture of the inputting device 20 and the position of the mass body 42 in the inputting device 20 when the user performs casting.

FIG. 8A depicts a relation between the posture of the inputting device 20 and the position of the mass body 42 in the inputting device 20 before casting is started. Before starting of casting, the control data generation section 124 generates control data such that the mass body 42 is positioned on the grip side, and the wireless communication module 102 transmits the control data to the inputting device 20.

In the inputting device 20, the wireless communication module 80 receives the control data, and the control data acquisition section 64 acquires the control data. The motor controlling section 66 controls the motor 32 on the basis of the control data such that the mass body 42 is positioned on the grip side. It is to be noted that, although, between the information processing apparatus 10 and the inputting device 20, the control data is transmitted from the wireless communication module 102 to the wireless communication module 80 and is acquired by the control data acquisition section 64, in the following description, description of transmission and reception of the control data is omitted.

FIG. 8B depicts a relation between the posture of the inputting device 20 and the position of the mass body 42 in the inputting device 20 during casting. When acquiring, from the motion analysis section 122, motion information indicating that casting motion is being performed by the inputting device 20, the control data generation section 124 generates control data for moving the mass body 42 from the grip side to the distal end side. In the inputting device 20, the motor controlling section 66 controls the motor 32 on the basis of the control data such that the mass body 42 moves to the distal end side. When the movement of the inputting device 20 stops, the mass body 42 is positioned on the most distal end side.

After the mass body 42 moves to the most distal end side, the game supplies, to the control data generation section 124, a vibration instruction for causing the distal end of the inputting device 20 to vibrate finely. In response to the vibration instruction, the control data generation section 124 generates control data for causing the vibrator 44 to vibrate. In the inputting device 20, the vibration controlling section 68 causes the vibrator 44, which is positioned at the distal end of the inputting device 20, to vibrate, on the basis of the control data. Consequently, the user can have a feeling that the fishing line goes out from the distal end of the fishing rod.

Figure 9A:
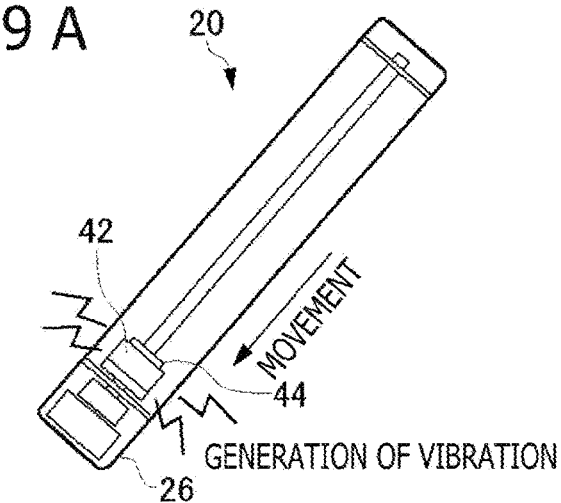

FIG. 9A depicts a position of the mass body 42 in the inputting device 20 when a fishing gimmick lands on the water. At the timing at which the fishing gimmick lands on the water, the game supplies, to the control data generation section 124, a movement instruction for moving the mass body 42 to the grip side. In response to the movement instruction, the control data generation section 124 generates control data for moving the mass body 42 to the grip side. In the inputting device 20, the motor controlling section 66 controls the motor 32 on the basis of the control data such that the mass body 42 moves to the grip side. At this time, in order to present an impact when the fishing gimmick lands on the water, the game may supply, to the control data generation section 124, a vibration instruction for causing the vibrator 44 to vibrate such that the control data generation section 124 generates control data for causing the vibrator 44 to vibrate.

Figure 9B:
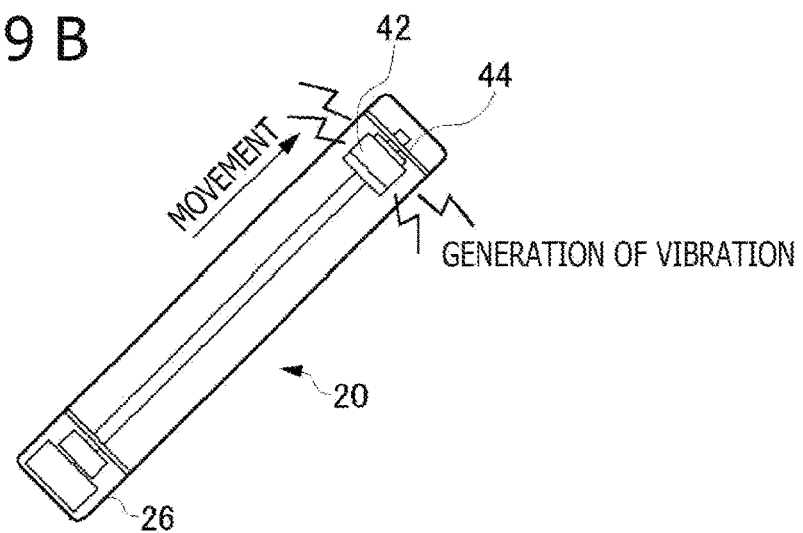

FIG. 9B depicts a behavior of the mass body 42 in the inputting device 20 when a fish catches on the fishing gimmick. If a fish catches, then the game supplies, to the control data generation section 124, a vibration instruction for causing the distal end of the inputting device 20 to vibrate by a great amount. In response to the vibration instruction, the control data generation section 124 generates control data for moving the mass body 42 to the distal end side and further generates control data for causing the vibrator 44 to vibrate. In the inputting device 20, the motor controlling section 66 controls the motor 32 on the basis of the control data such that the mass body 42 moves to the distal end side, and the vibration controlling section 68 controls the vibrator 44 to vibrate, on the basis of the control data.

Figure 9C:
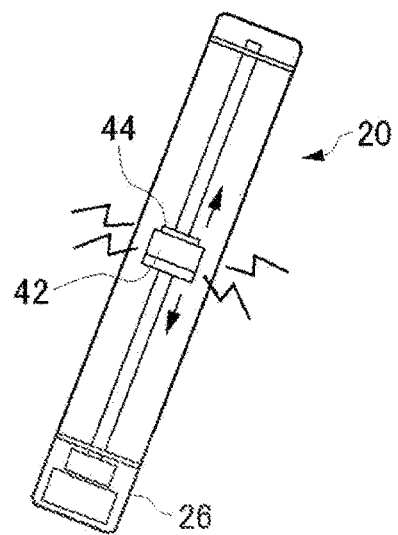

FIG. 9C depicts a behavior of the mass body 42 in the inputting device 20 when the fishing line is wound up. During winding up of the fishing line, the game supplies, to the control data generation section 124, a movement instruction for moving the mass body 42 back and forth according to the pull of the fish. At this time, the game may additionally supply, to the control data generation section 124, also a vibration instruction for causing the vibrator 44 to vibrate. In the inputting device 20, the motor controlling section 66 controls the motor 32 on the basis of the control data such that the mass body 42 moves back and forth forwardly and rearwardly at an intermediate position of the ball screw 34, and the vibration controlling section 68 causes the vibrator 44 to vibrate, on the basis of the control data.

In the fishing game, by the control data generation section 124 generating control data on the basis of a movement instruction and/or a vibration instruction from the game, the inputting device 20 can provide, to the user, a tactile feedback according to a situation of the game.

Figure 10:
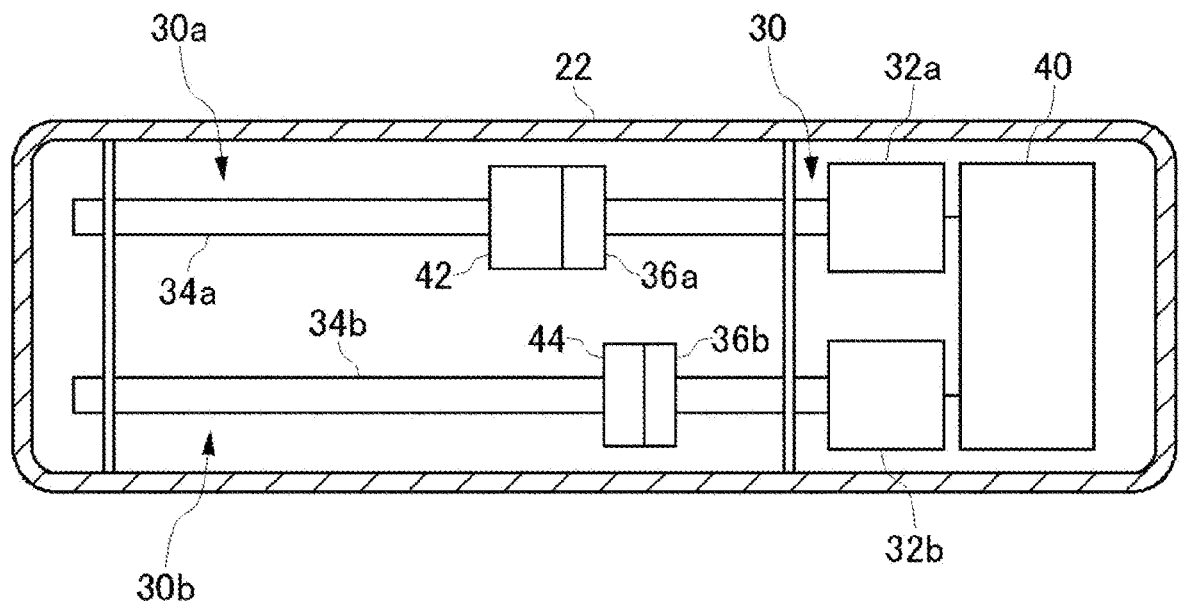
FIG. 10 is a schematic sectional view depicting another example of the internal structure of the inputting device.

FIG. 10 depicts another example of the internal structure of the inputting device. In FIG. 10, illustration of the operation button 24 is omitted. An inputting device 20a includes the mass body 42 arranged in the housing 22, the vibrator 44 arranged in the housing 22, the movement mechanism 30 that moves the mass body 42 and the vibrator 44 in the housing 22, and the processing device 40.

The movement mechanism 30 includes a first movement mechanism 30a that moves the mass body 42, and a second movement mechanism 30b that moves the vibrator 44. The first movement mechanism 30a is a linear motion mechanism including a motor 32a and a ball screw 34a, and a mover 36a moves on an axial line of the ball screw 34a by rotation of the ball screw 34a. The second movement mechanism 30b is a linear motion mechanism including a motor 32b and a ball screw 34b, and a mover 36b moves on an axial line of the ball screw 34b by rotation of the ball screw 34b.

The inputting device 20a is different from the inputting device 20 depicted in FIG. 2 in that, in the inputting device 20a, the mass body 42 and the vibrator 44 can be moved by movement mechanisms separate from each other. Consequently, the control unit 60 can control the dynamic change of the position of the center of gravity by the mass body 42 and the vibration generation position by the vibrator 44 independently of each other. In such a manner, the control unit 60 can change the position at which the vibrator 44 vibrates in the housing 22 and thus can generate an impact at any position.

For example, in a baseball game, the user uses the inputting device 20a as a bat. The game supplies a vibration instruction, which determines a position at which the vibrator 44 is to vibrate, according to the position on the bat at which it is hit by a ball, to the control data generation section 124. It is to be noted that the game may determine the amplitude and so forth of vibration and the length of vibration time and so forth, according to the position on the bat at which it is hit by the ball. The control data generation section 124 generates control data for causing the vibrator 44 to vibrate at the position designated by the game. According to the control data, the motor controlling section 66 controls the motor 32b to move the vibrator 44 to the vibration position, and the vibration controlling section 68 can cause the vibrator 44 having been moved to the position to vibrate.

Figure 11:
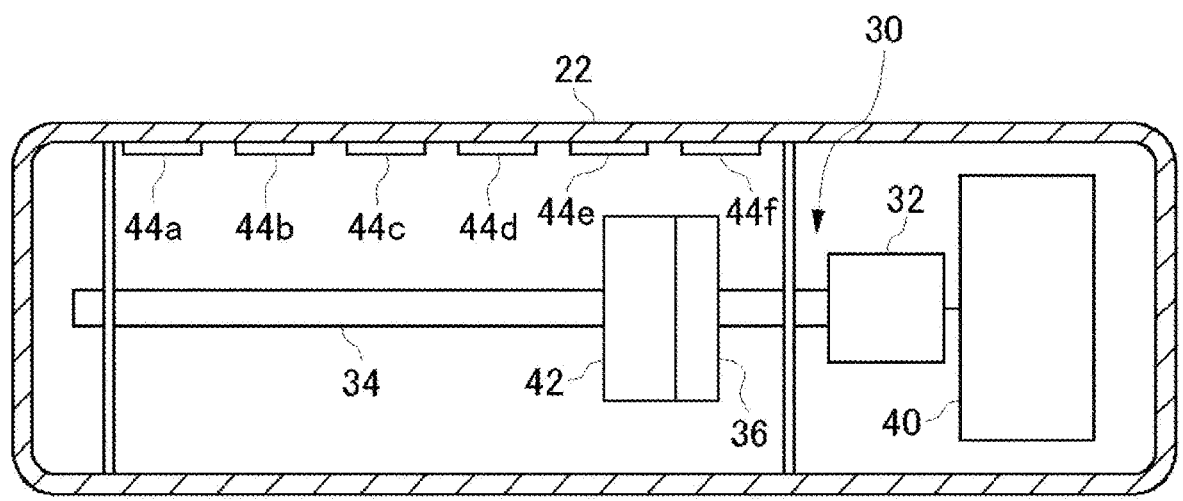
FIG. 11 is a schematic sectional view depicting still another example of the internal structure of the inputting device.

FIG. 11 depicts still another example of the internal structure of the inputting device. In FIG. 11, illustration of the operation button 24 is omitted. An inputting device 20b includes the mass body 42 arranged in the housing 22, a plurality of vibrators 44a, 44b, 44c, 44d, 44e, and 44f arranged in the housing 22, the movement mechanism 30 that moves the mass body 42 in the housing 22, and the processing device 40. The movement mechanism 30 is a linear motion mechanism including the motor 32 and the ball screw 34, and the mover 36 moves on an axial line of the ball screw 34 by rotation of the ball screw 34. In the structure example depicted in FIG. 11, the mass body 42 is fixed to the mover 36 such that the mass body 42 moves integrally with the mover 36.

The inputting device 20b is different from the inputting device 20 depicted in FIG. 2 in that, in the inputting device 20b, the plurality of vibrators 44a, 44b, 44c, 44d, 44e, and 44f are attached to positions different from one another in the longitudinal direction of the housing 22. By providing the plurality of vibrators 44a, 44b, 44c, 44d, 44e, and 44f almost without a gap left therebetween in the longitudinal direction of the housing 22, the control unit 60 can cause vibration at any position in the longitudinal direction of the housing 22.

For example, in a sword fight game, the user uses the inputting device 20 as a sword, and the game supplies, to the control data generation section 124, a vibration instruction that determines a vibration position of the vibrator 44, according to a position at which an opponent's sword hits. It is to be noted that the game may determine the amplitude and so forth of vibration and the length of vibration time and so forth, according to the power of the opponent's sword, the position at which the sword hits, and so forth. The control data generation section 124 generates control data for causing the vibrator 44, which is provided at the position designated by the game, to vibrate. Consequently, the vibration controlling section 68 can control the vibrator 44 to vibrate, according to the position hit by the sword.

The present disclosure has been described with reference to the embodiment. The embodiment is exemplary, and it will be recognized by those skilled in the art that various modifications are possible in combination of the components and the processes in the embodiment and that also such modifications fall within the scope of the present disclosure. Although, in the embodiment, the vibrator 44 is arranged in the housing 22, it may otherwise be arranged on the outer side of the housing 22.

Although, in the description of the embodiment, the motion analysis section 122 is described as a functioning block different from a game program, it may otherwise be one function in the game program. Further, the motion analysis section 122 may be provided in the control unit 60 in the inputting device 20 and analyze sensor data of the motion sensor 82.

What is claimed is:

1. A device comprising:
   a housing;
   a mass body arranged in the housing;
   a movement mechanism that moves the mass body in the housing;
   a vibrator; and
   a control unit that controls movement of the mass body and vibration of the vibrator, wherein the control unit is capable of changing a position at which the vibrator is to vibrate in the housing.

2. The device according to claim 1, wherein the movement mechanism includes a linear motion mechanism that moves the mass body in a longitudinal direction of the housing.

3. The device according to claim 1, wherein the movement mechanism moves the vibrator together with the mass body.

4. The device according to claim 1, wherein the movement mechanism includes a first movement mechanism that moves the mass body, and a second movement mechanism that moves the vibrator.

5. The device according to claim 1, wherein a plurality of the vibrators are attached to positions different from each other in a longitudinal direction of the housing.

6. The device according to claim 1, wherein the control unit includes
   a control data acquisition section that acquires control data,
   a motor controlling section that controls a motor of the movement mechanism on a basis of the control data, and
   a vibration controlling section that controls vibration of the vibrator on the basis of the control data.

7. The device according to claim 6, further comprising: a motion sensor, wherein the motor controlling section controls the motor of the movement mechanism, according to control data generated on a basis of sensor data detected by the motion sensor.

* * * * *